United States Patent [19]

Wood

[11] Patent Number: 5,056,757
[45] Date of Patent: Oct. 15, 1991

[54] PACKING CONTAINMENT FOR LIVE LOADED FUGITIVE EMISSION SEALS

[75] Inventor: Charles W. Wood, Marshalltown, Iowa

[73] Assignee: Fisher Controls International, Inc., Clayton, Mo.

[21] Appl. No.: 596,248

[22] Filed: Oct. 12, 1990

[51] Int. Cl.⁵ .................................... F16K 31/44
[52] U.S. Cl. ............................ 251/214; 277/59; 277/72 FM; 277/124
[58] Field of Search ............... 251/214; 277/59, 106, 277/124, 72 FM

[56] References Cited

U.S. PATENT DOCUMENTS

| | | | |
|---|---|---|---|
| 2,608,424 | 8/1952 | Everett | 277/106 |
| 2,973,978 | 3/1961 | Oppenheim | 286/26 |
| 3,011,808 | 12/1961 | Tucker et al. | 277/124 |
| 3,866,924 | 2/1975 | French | 277/59 |
| 3,968,970 | 7/1976 | Vogeli | 277/106 |
| 4,177,998 | 12/1979 | Laitkep et al. | 277/124 |
| 4,283,062 | 8/1981 | Catanzaro et al. | 277/124 |
| 4,640,305 | 2/1987 | Johnson | 251/214 |
| 4,886,241 | 12/1989 | Davis et al. | 277/59 |
| 4,913,951 | 4/1990 | Pitolaj | 277/235 R |

Primary Examiner—A. Michael Chambers
Attorney, Agent, or Firm—Marshall, O'Toole, Gerstein, Murray & Bricknell

[57] ABSTRACT

A fluid valve for use in high pressure and high temperature operating conditions where the operating fluid is chemically reactive. V-type PTFE packing members are backed up with anti-extrusion wiper rings of silica filled PTFE or barium sulfate filled PTFE.

6 Claims, 1 Drawing Sheet

PACKING CONTAINMENT FOR LIVE LOADED FUGITIVE EMISSION SEALS

This invention relates to packing containments for sealing operating members in a housing with fluids, and in particular to a packing containment assembly for preventing packing extrusions at high temperatures and high pressures.

BACKGROUND OF THE INVENTION

Packing material is widely used to prevent fluid leakage around an operating member in a housing with fluid, such as a rotary shaft or a sliding stem in fluid control valves or in a reciprocating pump member. Normally such packing is formed of a resilient material and is placed under a static load by being bolted into position within a packing box around the operating member. In other instances the packing is subjected to spring loading in what is known as a live loaded packing configuration. Live loaded packing is particularly useful in attempting to prevent leakage of undesired fluids into the environment. Also, it is desired to use packing material formed of polytetrafluorethylene (PTFE) because of its low frictional impact on an operating member.

Generally, because of its low elasticity, it has been found necessary to continually load PTFE packing in the containment assembly in order to enable the packing to set in and maintain a reliable and tight fluid seal against the operating member and the housing. However, in attempts to use PTFE packing in a live loaded packing configuration at extremely elevated temperatures and pressure conditions, the PTFE packing tends to deform and cold flow and eventually extrude out of the sealing area. Substantial extrusion of the PTFE packing leads to fluid leakage and increased wear and possible damage to the operating member and packing.

For example, fluid control valves are operated in environments where the operating pressure is less than about 1000 psi (6895 kPa) and the temperature of the fluid is less than about 200° F. (94° C.). However, certain applications of fluid valves require use in much higher pressure and temperature operational environments such as greater than 1000 psi (6895 kPa) and around 450° F. (232° C.). As an example, in the control of boiler feed water in power generating plants there is a requirement for fluid valves to reliably operate in pressures around 7200 psi (49644 kPa) and in temperature ranges of around 450° F. (232° C.).

Normally, valves operating at such pressure and temperature extremes use graphite packing material. (See for example U.S. Pat. No. 4,364,542 suggesting the use of a graphite packing material at temperatures above 250° F. (107° C.). However, the use of graphite packing leads to increased valve stem friction as the valve stem strokes through the packing thereby severely limiting valve operation and leading to increased wear on the packing material.

While desired, prior attempts to utilize PTFE packing at elevated pressure and temperature ranges was normally not recommended nor found feasible, particularly under live loaded packing conditions as indicated previously. In such attempts, it was found that the PTFE packing material extruded due to the severe pressures and movement of the operating member such as a valve stem, which tended to remove the material from the packing in long strands of string-like extrusions. Eventually, the continued removal and extruding of material from the packing led to a loss of sealing ability for the packing and thereby requiring early replacement of the packing material and possibly the operating member itself.

In U.S. Pat. No. 4,886,241, assigned to the same assignee as herein, there is described a packing containment structure for use in fluid valves at high pressure and high temperature conditions around 7200 psi (49644 kPa) and 450° F. (232° C.). This patent describes the use of PTFE packing material with an anti-extrusion wiper ring on each side of the packing material. The wiper rings are formed of high temperature organic or inorganic fiber material with a nitrile elastomeric binder. Such a packing containment structure has been found suitable for use at the described high pressures and temperatures where the fluid is water or other non-reactive fluid. However, due to the fiber material used for the anti-extrusion wiper rings, this packing containment structure is not recommended for use where the fluid is chemically active and where extremely stringent fluid control requirements must be met.

Because of the highly inert properties of PTFE it is desired to use such material for the anti-extrusion wiper ring in the configuration of the packing containment described in the aforementioned U.S. Pat. No. 4,886,241. However, the known undesired deformation and cold flow properties of PTFE negatively impact on the use of this material at the extreme temperatures and pressure conditions presently under consideration. Furthermore, while the aforementioned U.S. Pat. No. 4,886,241 describes how to use desired PTFE packing material at these elevated temperature and pressure conditions, only a fiber material with a nitrile elastomeric binder, i.e., a non-PTFE material, was suggested for the anti-extrusion wiper rings.

Accordingly, it is desired to provide a packing containment for use with chemically reactive fluids in high pressure and high temperature conditions such as greater than 1000 psi (6895 kPa) and around 450° F. (232° C.) with PTFE packing material and which inhibits the extrusion of PTFE.

SUMMARY OF THE INVENTION

In accordance with the principles of the present invention, there is provided a packing containment with anti-extrusion provisions for use with PTFE packing for sealing an operating member in a housing with fluid, such as in a sliding stem valve, rotary shaft valve, or reciprocating pump member at high temperature and pressure conditions, and particularly where the operating fluid is chemically active. The packing containment includes V-type PTFE packing rings which are in a loaded condition. On each side of the packing rings there is provided an anti-extrusion ring each of which is formed of PTFE with a substantially inert filler. The preferred embodiment is to utilize a glass (silica) filled or barium sulfate filled PTFE anti-extrusion ring. Other filled PTFE materials could be utilized, such as a carbon or graphite filled PTFE material.

The anti-extrusion wiper rings have an inner diameter substantially the same as the diameter of the operating member so that there is an interference fit between the wiper rings and the operating member. Other polymer material or other filled PTFE material could be used to form the anti-extrusion wiper rings if such material has the desired properties of the aforementioned silica filled PTFE or barium sulfate filled PTFE, i.e., substantially inert; low frictional characteristics; good lubrication properties; low elasticity; and a higher strength than PTFE alone. Either single or double packing type configurations may be utilized as desired.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which:

DETAILED DESCRIPTION

Figure 1:
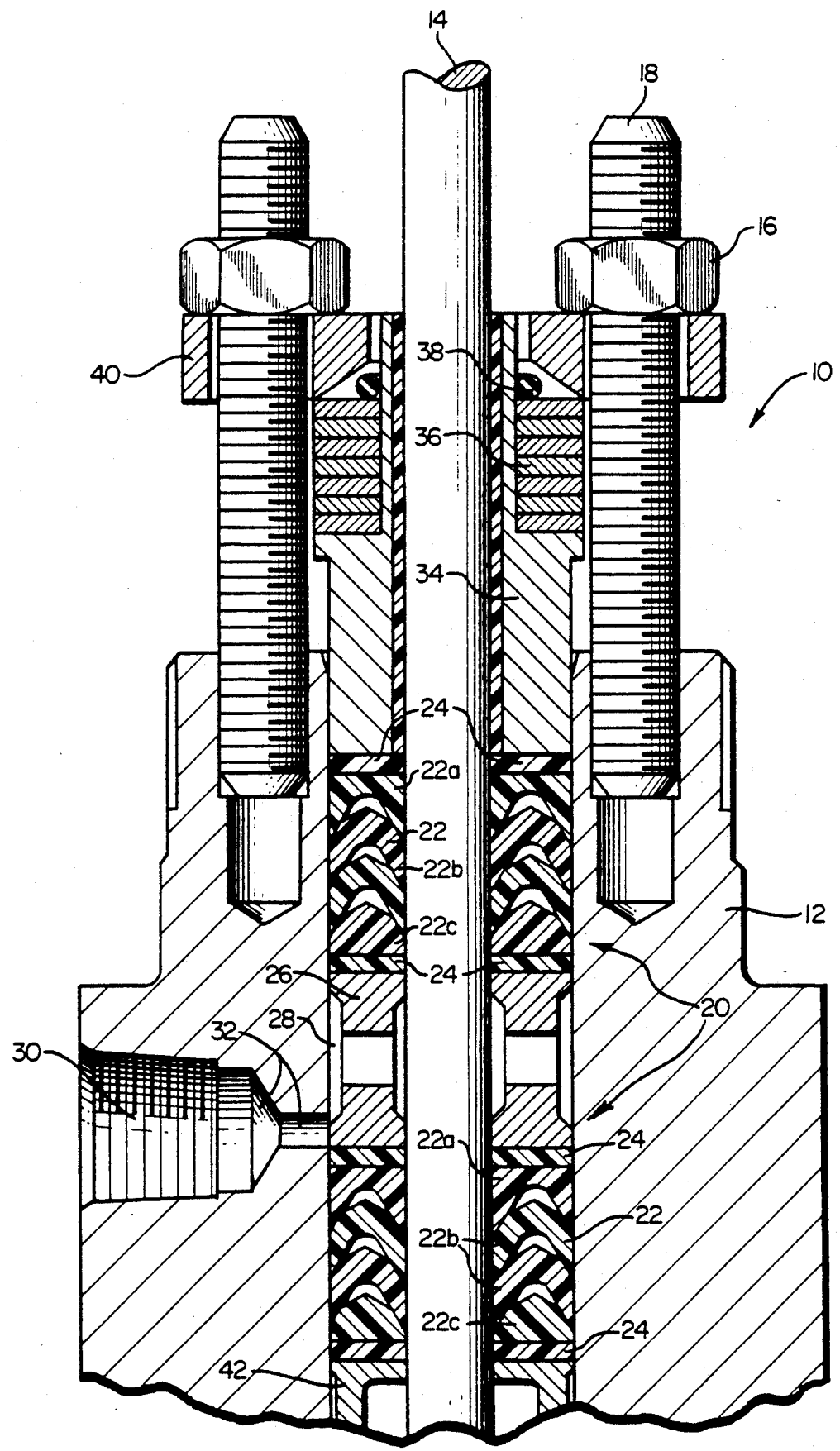
FIG. 1 is a sectional view illustrating a packing containment in a fluid valve structure in accordance with the principles of the present invention.

FIG. 1 illustrates a fluid valve 10 having a valve body 12 through which extends a valve stem 14. Packing nuts 16 are threadably mounted on packing studs 18 so as to adjust the loading on the packing around the valve stem.

A respective packing containment 20 in accordance with the present invention is provided for each packing configuration in the double packing for valve 10. It is to be understood that the invention is illustrated herein in connection with a sliding stem valve for purposes of illustration only, whereas the principles of the invention are also applicable to rotary shaft valves, pumps, and to other devices in which an operating member is moving in a housing and the operating member is to be sealed from fluid passing through or contained within the housing. Packing containment 20 in accordance with the present invention is particularly useful for reliable sealing of the operating member where the housing such as valve 10 is to be used with fluids operating in pressures greater than 1000 psi (6895 kPa) and in temperature ranges of around 450° F. (232° C.) and where the fluid could react with the packing containment structure.

Each packing containment 20 includes a packing 22 surrounding valve stem 14 and is formed of a series of rings of the type commonly referred to as V-type packing. Each packing set in packing containment 20 includes four V-rings including a top female adapter ring 22a; two identical middle rings 22b; and a bottom male adapter ring 22c. V-type packing 22 is formed of PTFE (polytetrafluorethylene—a synthetic resin polymer) and therefore packing 22 is known in the trade as a "V-type PTFE packing".

Packing suitably formed of other material or of other synthetic resin polymers having properties similar to PTFE, i.e., generally inert, low frictional characteristics, good lubricational properties, and low elasticity, may be utilized.

A respective anti-extrusion wiper ring 24 is located at each end of each set of packing 22 and includes an inner diameter substantially the same as the diameter of valve stem 14 so that there is an interference fit therebetween. The wiper rings tend to wipe the stem, inhibit packing extrusion, and contain any packing extrusion within the packing assembly.

Each wiper ring is formed of a glass (silica) filled PTFE material. Such material is commonly available from Garlock Mechanical Packing Division, Palmyra, N.Y., under the trademark Gylon, style 3500, fawn. Another material found suitable for wiper ring 24 is a barium sulfate filled PTFE material available commercially from the same company, and also under the trademark Gylon, style 3510, off white.

Carbon or graphite filled PTFE may also be used for wiper ring 24. Other substantially inert fillers with PTFE or other synthetic resin polymers may be utilized if they exhibit desirable characteristics of being generally inert, having low frictional characteristics, good lubrication properties, having low elasticity, and having a higher strength than PTFE alone.

A lantern ring 26 is placed around the valve stem and between the two packing sets. As in the conventional use of lantern rings and valves, lantern ring 26 further is adapted in packing bore 28 to enable communication from the valve exterior via access hole 30 and connecting channels 32. This permits lubricating fluid to be inserted into the packing bore and adjacent valve stem 14 and also to permit testing for any leakage around the valve stem or to vent such leakage to a safe location.

Valve 10 includes a live load packing system with a packing follower 34 having one end adjacent the upper wiper ring 24 and with a series of Belleville disk springs 36 mounted at the other packing follower end. The Belleville disk springs are maintained in position on packing follower 34 by means of an O-ring 38. A packing flange 40 engageably contacts one end of the Belleville disk springs 36. Packing nuts 16 are tightened so that packing flange 50 transmits the packing stud and nut load to the Belleville disk springs 36 until an optimum live loading is obtained when the Belleville springs, starting from their uncompressed state, are about 85% compressed as shown in the conditions of FIG. 1. Optimum loading is achieved when the top edge of packing follower 34 is flush with the top surface of packing flange 40 as shown in FIG. 1. A packing box ring 42 is mounted below the second set of packing members 22 and at the end of packing bore 28.

The foregoing detailed description has been given for clearness of understanding only, and no unnecessary limitations should be understood therefrom, as modifications will be obvious to those skilled in the art.

What is claimed is:

1. A fluid valve for use in high pressure and high temperature operating conditions greater than 1000 psi (6895 kPa) and around 450° F. (232° C.), said fluid valve comprising:

a valve body;

an operating member movably mounted within said valve body for operating said valve;

a packing bore within said valve body to surround the outer diameter of said operating member;

packing loading means at opposite ends of said packing bore;

at least two packing members in said packing bore formed of PTFE material for normal valve operation in environments having temperature ranges around 450° F. (232° C.) and surrounding the outer diameter of said operating member between said packing loading means, each of said packing members formed of a first face and an opposite second face with the respective first faces adapted for mating contact and the respective opposite second faces being planar-shaped, said packing members assembled and disposed in said packing bore with the first faces facing each other at the inner portion of the packing member assembly, and the respective planar-shaped second faces at the opposite outer ends of the packing members assembly;

at least one flat, thin, symmetrical, anti-extrusion wiper ring surrounding said operating member at each respective outer end of the packing members assembly and engageably contacting a respective planar-shaped second face thereof, said anti-extrusion wiper rings each formed of a filled PTFE material having higher strength characteristics than the PTFE material of said packing members and suitable for normal valve operation in environments having temperature ranges around 450° F. (232° C.) and having an inner diameter sized to form an interference fit with the operating member to wipe the operating member, inhibit packing extrusion, and contain any packing extrusion between said anti-extrusion wiper rings at respective outer ends of the packing members assembly during normal valve operation.

2. A fluid valve according to claim 1, wherein each of said anti-extrusion wiper rings is formed of a silica filled PTFE material.

3. A fluid valve according to claim 1, wherein each of said anti-extrusion wiper rings is formed of a barium sulfate filled PTFE material.

4. A fluid valve for use in high pressure and high temperature operating conditions greater than 1000 psi (6895 kPa) and around 450° F. (232° C.), said fluid valve comprising:

a valve body;

an operating member movably mounted within said valve body for operating said valve;

a packing bore within said valve body to surround the outer diameter of said operating member;

packing loading means at opposite ends of said packing bore;

a pair of packing assemblies in said packing bore formed of PTFE material for normal valve operation in environments having temperature ranges around 450° F. (232° C.) and surrounding the outer diameter of said operating member, each of said packing assemblies including at least two packing rings each formed of a first face and an opposite second face with the respective first faces adapted for mating contact and the respective opposite second faces being planar-shaped, each of said packing assemblies disposed in said packing bore with the first faces of the packing rings facing each other at the inner portion of the packing assemblies, and the respective planar-shaped second faces of the packing rings at the opposite outer ends of the packing assemblies;

passage means for communicating the exterior of said valve body with said packing bore and said operating member, including a lantern ring between said pair of packing assemblies;

at least one flat, substantially planar, symmetrical, anti-extrusion wiper ring surrounding said valve stem at each respective outer end of said pair of packing assemblies and between said lantern ring and each respective inner end of said pair of packing assemblies, each of said anti-extrusion wiper rings engageably contacting a respective planar-shaped second face thereof of said packing ring, said anti-extrusion wiper rings each formed of a filled PTFE material having higher strength characteristics than the PTFE material of said packing members and suitable for normal valve operation in environments having temperature ranges around 450° F. (232° C.) and having an inner diameter sized to form an interference fit with the operating member to wipe the operating member, inhibit packing extrusion, and contain any packing extrusion between said anti-extrusion wiper rings at each respective outer end of said pair of packing members during normal valve operation.

5. A fluid valve according to claim 4, wherein each of said anti-extrusion wiper rings is formed of a silica filled PTFE material.

6. A fluid valve according to claim 4, wherein each of said anti-extrusion wiper rings is formed of a barium sulfate filled PTFE material.

* * * * *